(12) United States Patent
Zhu et al.

(10) Patent No.: US 11,571,655 B2
(45) Date of Patent: Feb. 7, 2023

(54) ACTIVATED CARBON ADSORPTION TOWER AND GAS PURIFICATION DEVICE

(71) Applicant: INSTITUTE OF PROCESS ENGINEERING, CHINESE ACADEMY OF SCIENCES, Haidian District (CN)

(72) Inventors: Tingyu Zhu, Haidian District (CN); Yuran Li, Haidian District (CN); Bin Wang, Haidian District (CN); Shuai Zhang, Haidian District (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 640 days.

(21) Appl. No.: 16/473,872

(22) PCT Filed: Dec. 29, 2016

(86) PCT No.: PCT/CN2016/112836
§ 371 (c)(1),
(2) Date: Jun. 26, 2019

(87) PCT Pub. No.: WO2018/119812
PCT Pub. Date: Jul. 5, 2018

(65) Prior Publication Data
US 2019/0344212 A1 Nov. 14, 2019

(51) Int. Cl.
*B01D 53/08* (2006.01)
*B01D 53/62* (2006.01)
(Continued)

(52) U.S. Cl.
CPC .............. *B01D 53/08* (2013.01); *B01D 53/62* (2013.01); *B01D 53/81* (2013.01); *B01J 8/08* (2013.01); *B01D 2265/06* (2013.01)

(58) Field of Classification Search
CPC .................................. B01D 53/08; B01J 8/00
See application file for complete search history.

(56) References Cited

U.S. PATENT DOCUMENTS

| 4,725,290 A | | 2/1988 | Ohlmeyer et al. | |
| 5,053,210 A | * | 10/1991 | Buxel | B01D 53/08 |
| | | | | 423/239.1 |
| 5,294,420 A | * | 3/1994 | Ito | B01D 53/60 |
| | | | | 423/244.01 |

FOREIGN PATENT DOCUMENTS

| CN | 1410151 | 4/2003 |
| CN | 101721882 | 5/2010 |

(Continued)

OTHER PUBLICATIONS

International Search Report in related PCT/CN2016/112836 dated Oct. 11, 2017.
Office Action in related JP2019-535909 dated Feb. 2, 2021.

*Primary Examiner* — Robert A Hopkins
(74) *Attorney, Agent, or Firm* — Woodard, Emhardt, Henry, Reeves & Wagner, LLP

(57) ABSTRACT

Disclosed are an activated carbon adsorption tower and a gas purification device. An activated carbon adsorption tower comprises an adsorption tower body (1), a gas inlet (2) and a gas outlet (3) arranged on the adsorption tower body (1); the adsorption tower body (1) is provided with an activated carbon passage (11), a swash plate (12) and a gas passage in communication with the gas inlet (2) and the gas outlet (3); the gas passage is separated by the swash plate (12) into a U shape or serpentine shape, making the gas passage pass through the same activated carbon passage (11) from the opposite direction at least once; and the activated carbon passage (11) is provided with flowing activated carbon inside and gas holes on the passage wall for communicating with the gas passages on both sides.

8 Claims, 4 Drawing Sheets

(51) Int. Cl.
*B01D 53/81* (2006.01)
*B01J 8/08* (2006.01)

(56) References Cited

FOREIGN PATENT DOCUMENTS

| | | |
|---|---|---|
| CN | 204543923 | 5/2015 |
| CN | 204502756 | 7/2015 |
| JP | S52-33885 A | 3/1977 |
| JP | S58-189024 A | 11/1983 |
| JP | S59-130522 A | 7/1984 |
| JP | S59-142823 A | 8/1984 |
| JP | 02211212 | 8/1990 |

* cited by examiner

ACTIVATED CARBON ADSORPTION TOWER AND GAS PURIFICATION DEVICE

TECHNICAL FIELD

The present invention relates to the technical field of gas purification, in particular to an activated carbon absorption tower and a gas purification device.

BACKGROUND

The technology for removing pollutants from a flue gas by an activated carbon method, as a technology of solid phase removal by adsorption, can achieve integrated removal of $SO_2$, $NO_X$, organics, heavy metals and dust with a desulfurization rate reaching 95% or more and a denitration rate reaching 80% or more. Wherein, the sulfur resource is recovered by the regeneration of the adsorbent, the pollutant emission is greatly controlled, and no other waste is generated, the secondary pollution is reduced. Moreover, the integrated process also shortens the industrial process.

Activated carbon absorption tower is the core equipment of the entire purification process, and fixed beds and moving beds are widely used in the absorption tower. The fixed beds fail to be applied to working conditions with large smoke volume due to its intermittent operation mode, while the moving beds can be continuously operated and suitable for various working conditions, and have been widely used in industry. According to the moving directions of flue gas and activated carbon, the moving beds can be divided into cross-flow type and counter-flow type. The flow path separation of gas and solid in the cross-flow type is convenient for gas/solid phase separation treatment, with large gas-solid contact area, large processing gas volume, simple structure with less moving parts and easy maintenance. discloses a cross-flow moving-bed activated carbon exhaust gas absorption tower, characterized in that a plurality of gas outlet branch pipes distributed in the tower are connected to the gas outlet of the absorption tower. The circumference of the gas outlet branch pipes is wrapped by an activated carbon layer. Such a design maximizes the contact area with the flue gas, so that the flowing activated carbon adsorbent layer as a whole is effectively utilized. However, the absorption tower disclosed in this patent has a complicated process, with nonuniform distribution of the airflow field and larger resistance.

Japanese Patent No. JP2942567B2 entitled "Cylindrical Moving-Bed Gas Processing Device and Exhaust Gas Desulfurization and Denitration Device Thereof" discloses a cross-flow cylindrical moving-bed desulfurization and denitration device, characterized in that concentric inner and outer cylinders form a vertical double cylinder, and a plurality of sets of rectangular activated carbon moving layers are arranged between the inner and outer cylinders, so that the flue gas is contacted with activated carbon between the inner and outer cylinders for purification. This device has a smaller footprint and a large processing gas volume, but has a complicated structure and high manufacturing cost.

Japanese Patent No. JP1994170164A entitled 'Activated Carbon Denitration Device" discloses a cross-flow moving-bed denitration device, characterized in an integrated arrangement of desulfurization and denitration. In the device, $SO_2$ is first removed by a limestone method, and then $NO_X$ is removed with activated carbon by spraying ammonia gas or aqueous ammonia. The device has a higher denitration efficiency. However, the process is a superposition of two methods, rather than an integrated removal technique in the true sense.

At present, activated carbon absorption towers adopting cross-flow moving beds generally has the problems of low utilization rate of activated carbon, low removal efficiency of impurities, complicated mechanism of the absorption tower, and large gas flow resistance and the like.

SUMMARY

A first object of the present invention is to propose an activated carbon absorption tower in which gas is repeatedly contacted with activated carbon to improve the utilization rate of activated carbon, and the structure of the activated carbon absorption tower is simple, which allows small gas flow resistance and can remarkably improve the efficiencies of desulfurization and denitration.

To achieve this object, the present invention adopts the following technical solutions:

An activated carbon absorption tower, comprising an absorption tower body, a gas inlet and a gas outlet arranged on the absorption tower body; the absorption tower body is provided with an activated carbon passage, a baffle plate and a gas flow passage connecting the gas inlet and the gas outlet; the gas flow passage is separated by the baffle plate into a U shape or serpentine shape, making the gas flow passage pass through the same activated carbon passage from opposite directions at least once; and the activated carbon passage is provided with flowing activated carbon inside and gas holes on the passage wall for connecting the gas flow passages on both sides.

Wherein, a plurality of the gas flow passages are provided, and each of the gas flow passages is provided corresponding to at least one of the activated carbon passages and passing through the corresponding activated carbon passages from opposite directions at least once.

Wherein, an ammonia injection grid is arranged in a region within the gas flow passage where the gas inflows after passing through the activated carbon passage for the first time.

Wherein, the absorption tower body is divided into two parts by the activated carbon passage, the baffle plate is located between the activated carbon passage and the inner wall of the absorption tower body for dividing the gas flow passage to form the U-shaped passage, and the gas inlet and the gas outlet are located on the same side of the activated carbon passage and are respectively located on two sides of the baffle plate.

Wherein, the ratio of the distances from the contact point of the baffle plate and the activated carbon passage respectively to the two ends of the activated carbon passage is 1:1-1:4.

Wherein, the ratio of the distances from the two sides of the activated carbon passage respectively to the inner wall of the absorption tower body on the same side is 4:1-1:1.

Wherein, the activated carbon passage is provided with a perforated partition plate or a reticulated partition plate along the activated carbon passage for dividing the activated carbon passage into a plurality of layers.

Wherein, each layer of the activated carbon passage is provided with an activated carbon feed bin and an on-off valve at both ends, and further a controller at the lower end of the activated carbon passage for controlling the flow rate of the activated carbon.

Wherein, a flow deflector is arranged inside the gas inlet, and a gas flow distributor is arranged inside the gas flow passage.

A second object of the present invention is to propose such a gas purification device that gas in the activated carbon absorption tower therein is repeatedly contacted with activated carbon to improve the utilization rate of activated carbon, and the structure of the activated carbon absorption tower is simple, which allows small gas flow resistance and can remarkably improve the efficiencies of desulfurization and denitration.

To achieve this object, the present invention adopts the following technical solution:

A gas purification device comprising the forementioned activated carbon absorption tower.

Beneficial effects: The present invention provides an activated carbon absorption tower and a gas purification device. An activated carbon absorption tower comprises an absorption tower body, a gas inlet and a gas outlet arranged on the absorption tower body; the absorption tower body is provided with an activated carbon passage, a baffle plate and a gas flow passage connecting the gas inlet and the gas outlet; the gas flow passage is separated by the baffle plate into a U shape or serpentine shape, making the gas flow passage pass through the same activated carbon passage from opposite directions at least once; and the activated carbon passage is provided with flowing activated carbon inside and gas holes on the passage wall for connecting the gas flow passages on both sides. The U-shaped or serpentine-shaped gas flow passage allows the gas to pass through the activated carbon multiple times so as to improve the utilization rate of the activated carbon, and the structure of the activated carbon absorption tower is simple, which allows small gas flow resistance and can remarkably improve the efficiencies of desulfurization and denitration.

wherein:

1. absorption tower body; 11. activated carbon passage; 12. baffle plate; 13. ammonia injection grid; 2. gas inlet; 3. gas outlet; 4. activated carbon feed bin.

DETAILED DESCRIPTION

In order to make the technical problems solved by the present invention, the technical solutions adopted, and the technical effects achieved clearer, the technical solutions of the present invention are further illustrated below by the specific embodiments in connection with the appended drawings.

EXAMPLE 1

Figure 1:
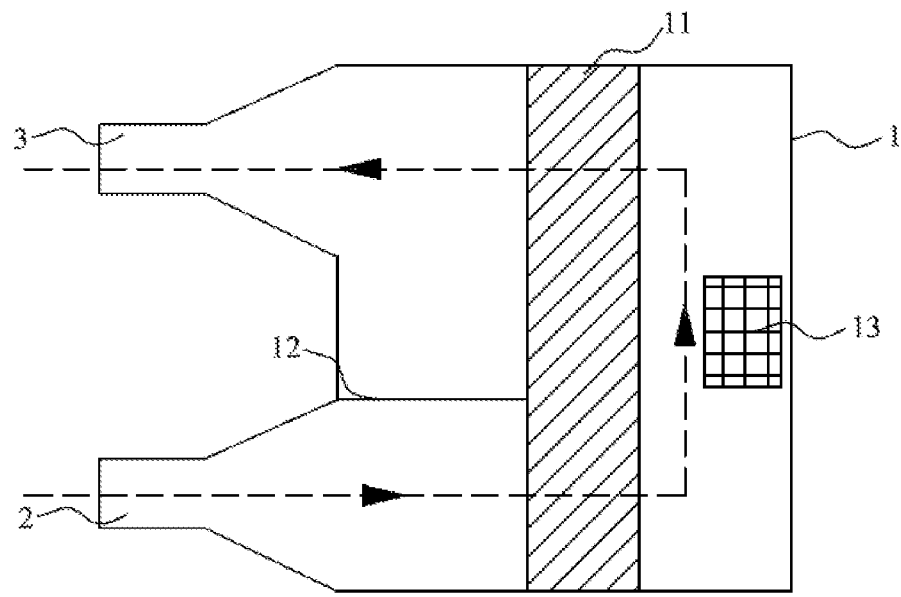
FIG. 1 is a schematic view showing the internal structure of an activated carbon absorption tower provided in Example 1 of the present invention.
Figure 2:
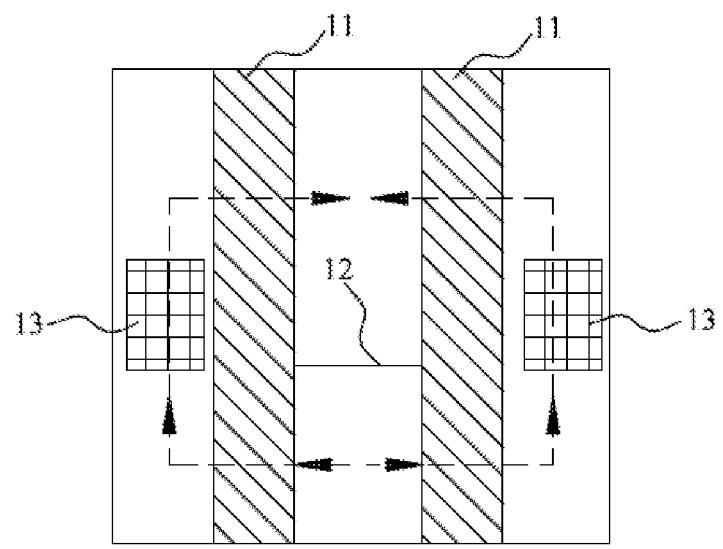
FIG. 2 is a schematic view showing the internal structure of another activated carbon absorption tower provided in Example 1 of the present invention.
Figure 3:
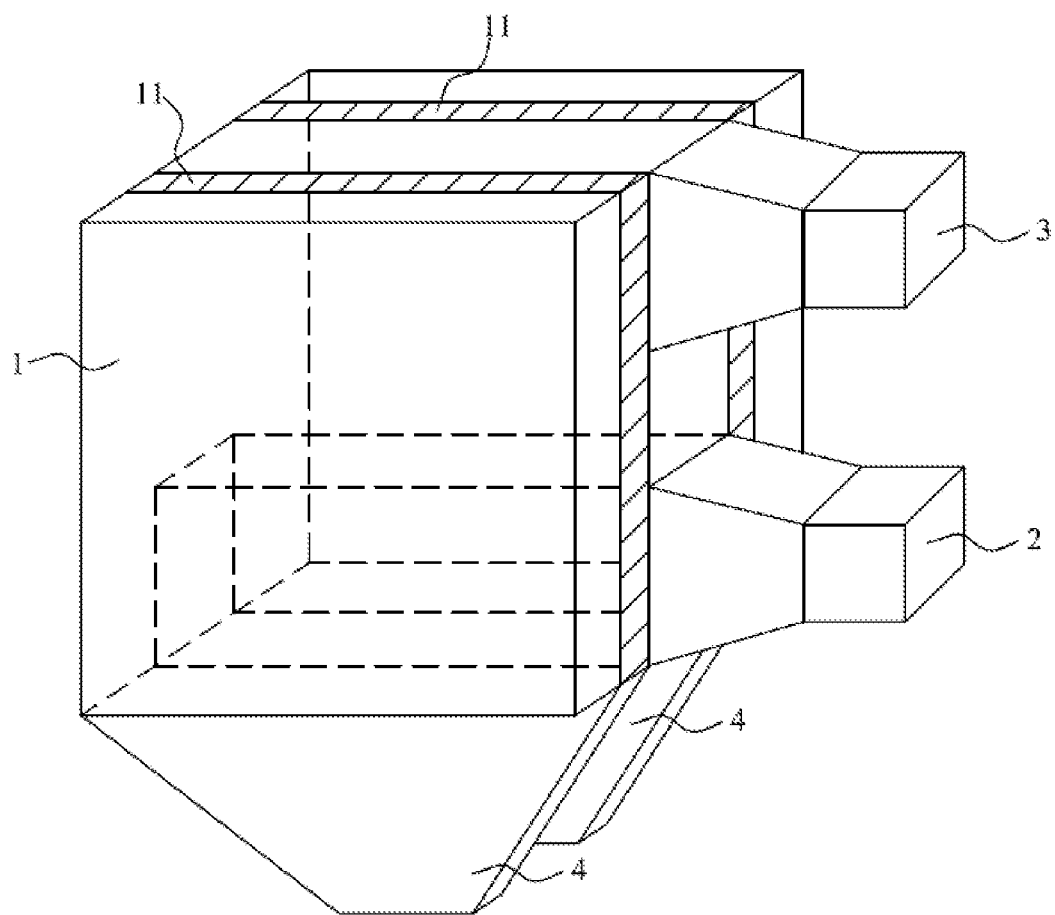
FIG. 3 is a schematic view showing the structure of another activated carbon absorption tower provided in Example 1 of the present invention.

This example provides an activated carbon absorption tower, as shown in FIGS. 1-3, comprising an absorption tower body 1, a gas inlet 2 and a gas outlet 3 arranged on the absorption tower body 1; the absorption tower body 1 is provided with an activated carbon passage 11, a baffle plate 12 and a gas flow passage connecting the gas inlet 2 and the gas outlet 3; the gas flow passage is separated by the baffle plate 12 into a U shape or serpentine shape, making the gas flow passage pass through the same activated carbon passage 11 from opposite directions at least once; and the activated carbon passage 11 is provided with flowing activated carbon inside and gas holes on the passage wall for connecting the gas flow passages on both sides.

A cross-flow moving-bed adsorption process is adopted for the activated carbon absorption tower in this example. Compared with the existing technologies, the gas flow passage of the activated carbon absorption tower in this example is U-shaped, as shown in FIG. 1. A fold-back flow mode is adopted for the flow of gas in the gas flow passage, that is, the gas passes through the same activated carbon passage 11 from opposite directions, which increases the adsorption times of the activated carbon, so that the gas and the activated carbon are in full contact, thereby the utilization rate of the activated carbon is improved. In addition, the activated carbon absorption tower has a simple structure and a small gas flow resistance, which can significantly improve the efficiencies of desulfurization and denitration.

Generally, the impurities in the gas absorbed by the activated carbon adsorption method are sulfides such as $SO_2$ and $NO_X$. The sulfides are adsorbed by the activated carbon when the gas passes through the activated carbon passage 11, while the $NO_X$ needs to be adsorbed by the activated carbon after being mixed with an ammonia gas. Specifically, the absorption tower body 1 is divided into two parts by the activated carbon passage 11, the baffle plate 12 is located between the activated carbon passage 11 and the inner wall of the absorption tower body 1 for dividing the gas flow passage to form the U-shaped passage, and the gas inlet 2 and the gas outlet 3 are located on the same side of the activated carbon passage 11 and are respectively located on two sides of the baffle plate 12. After flowing into the gas flow passage from the gas inlet 2, the gas passes through the gas holes provided on the passage wall of the activated carbon passage 11 to contact with the activated carbon, and the sulfides such as $SO_2$ in the gas are adsorbed by the activated carbon and then the gas is uniformly mixed with the ammonia gas injected from the ammonia injection grid 13 provided in the gas flow passage for passing through the activated carbon passage 11 again to achieve the effect of denitration. In this example, an ammonia injection grid 13 is arranged in a region within the gas flow passage where the gas inflows after passing through the activated carbon passage 11 for the first time, so that the sulfides in the gas are absorbed after the gas passing through the activated carbon passage 11 for the first time, and the concentration of the sulfides in the gas is reduced. The ammonia gas injected from the ammonia injection grid 13 is conveniently and sufficiently mixed with the $NO_X$ in the gas so as to improve the utilization rate of the ammonia gas and the denitration efficiency, and to improve the economic benefits of the activated carbon absorption tower.

In this example, a part of the activated carbon passage 11 opposite to the gas inlet 2 is mainly for absorbing sulfides such as $SO_2$ in the gas, and the gas is uniformly mixed with the ammonia gas after passing through the activated carbon for the first time, and a part of the activated carbon passage 11 where the gas passes through again is mainly for absorbing the nitrogen oxides in the gas, so as to achieve the effect of integrated desulfurization and denitration. In this example, the ratio of the distances from the contact point of the baffle plate 12 and the activated carbon passage 11 respectively to the two ends of the activated carbon passage 11 may be 1:1-1:4, and the ratio of the distances from the two sides of the activated carbon passage 11 respectively to the inner wall of the absorption tower body 1 on the same side may be 4:1-1:1. The activated carbon in the activated carbon passage opposite to the gas inlet mainly plays the role of adsorbing the sulfides in the gas. The gas is mixed with the ammonia gas and then passes through the activated carbon passage again to absorb the nitrogen oxides in the gas. Therefore, the above ratios are determined by comprehensively considering the concentration ratio of various impurities in the gas, and can be adjusted according to the concentration of sulfides or nitrogen oxides in the gas to be purified in actual use, so as to rationally utilize resources such as activated carbon and ammonia gas.

As shown in FIG. 2-FIG. 3, in this example, a plurality of the gas flow passages may be provided, and each of the gas flow passages is provided corresponding to at least one of the activated carbon passages 11 and passing through the corresponding activated carbon passages 11 from opposite directions at least once. As shown in FIG. 2, the openings of the two U-shaped gas flow passages are oppositely disposed, and the gas inlet 2 is located between the two activated carbon passages 11. After the gas flows from the gas inlet 2 into the gas flow passage, it passes through the activated carbon passages 11 on both sides, and is mixed with the ammonia gas and then passes through the part of the activated carbon passages 11 opposite to the gas outlet 3 in the opposite direction again and then flows out via the gas outlet 3. Increasing the gas flow passages can increase the gas capacity of the activated carbon absorption tower for one-time purification, and improve the efficiencies of desulfurization and denitration.

In order to balance the concentrations of sulfides such as $SO_2$ and $NO_X$ in the gas and the utilization rate of the activated carbon in the activated carbon passage 11, the activated carbon more suitably accounts for 25%-63% of the space inside the absorption tower body 1. If the activated carbon accounts for too much of the space inside the absorption tower body 1, and the inflow of the gas is less, relatively the sulfides such as $SO_2$ and $NO_X$ to be adsorbed are less, and the activated carbon flows in the activated carbon passage 11 in real time, which leads to low adsorption saturation and insufficient utilization of the activated carbon; on the contrary, if the proportion of the activated carbon is less and the inflow of the gas is more, as a result, the sulfides such as $SO_2$ and $NO_X$ in the gas are not completely absorbed.

The thickness of the activated carbon passage 11 may be 0.8-2.5 m, and the specific value may be adjusted according to the concentration of sulfides such as $SO_2$ in the gas, the concentration of $NO_X$, and the flow rate of the activated carbon, so as to improve the desulfurization rate and denitration rate under the premise of rationally utilizing the activated carbon resources.

Since the activated carbon in the activated carbon passage 11 is flowing, the activated carbon passage 11 is provided with an activated carbon feed bin 4 and an on-off valve at both ends. The activated carbon feed bin 4 is in communication with the activated carbon passage 11, and the on-off valve is used for controlling the activated carbon to flow out of or flow into the activated feed bin 4. In addition, the edge of the valve plate of the on-off valve can be made of soft materials with high temperature resistance, such as metal-doped asbestos material, to increase the sealing performance of the on-off valve. The material with high temperature resistance can prevent deformation of the valve plate caused by the temperature increase during the reaction of the gas with the ammonia gas in the absorption tower, and avoid leakage of contaminated gas when the activated carbon is replaced. The activated carbon passage 11 is further provided with a controller at the lower end, and the controller can control the flow rate of the activated carbon in the activated carbon passage 11. The flow rate of the activated carbon can be adjusted according to the concentration of the substances to be adsorbed in the actual gas and the adsorption rate.

In order to make the gas distribution in the activated carbon absorption tower uniform, a flow deflector is further arranged at the gas inlet 2 to guide the gas into the gas passage. A gas flow distributor is further arranged inside the gas passage to uniformly distribute the gas in the activated carbon absorption tower, thereby improving the efficiencies of desulfurization and denitration.

The activated carbon absorption tower in this example has a simple structure and a small gas flow resistance, and allows the activated carbon to flow smoothly in the activated carbon passage 11. Generally, the residence time of the gas in the activated carbon is 3-25 s, which significantly improves the efficiencies of desulfurization and denitration.

EXAMPLE 2

Figure 4:
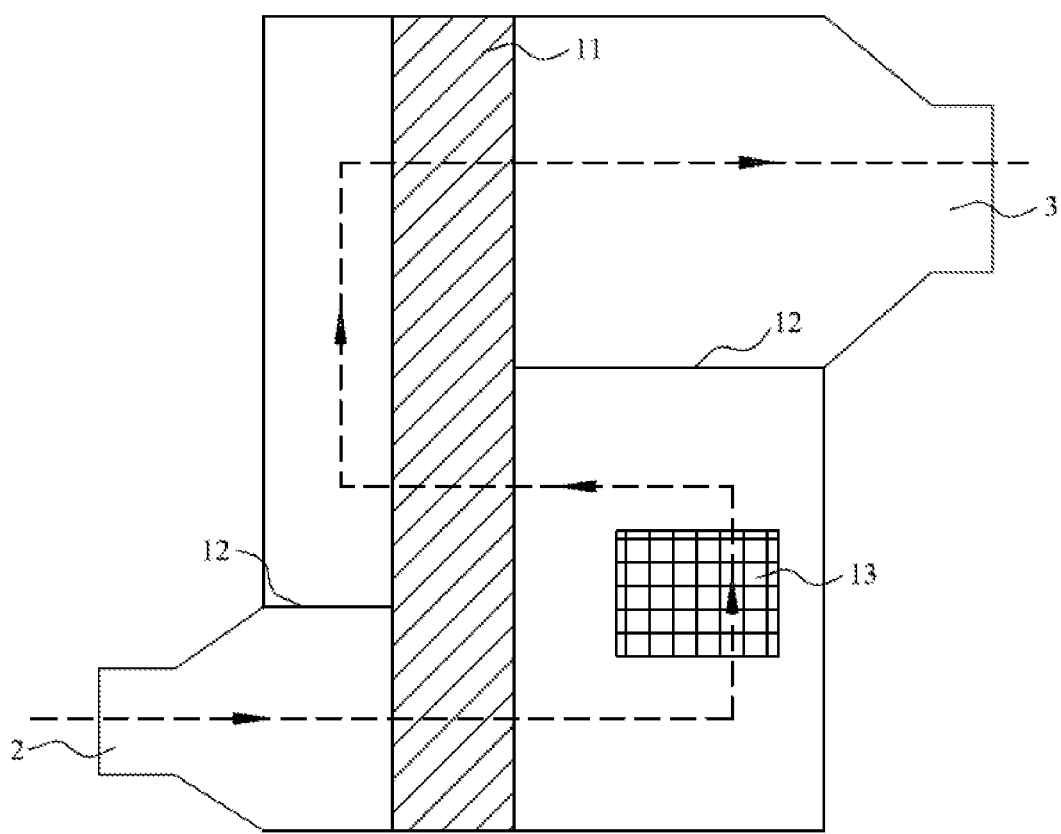
FIG. 4 is a schematic view showing the internal structure of an activated carbon absorption tower provided in Example 2 of the present invention.

Different from Example 1, the baffle plate 12 in this example separates the gas flow passage in the activated carbon absorption tower into a serpentine shape, i.e., similar to a S-shaped winding fold-back form. As shown in FIG. 4, the activated carbon passage 11 is respectively provided with a baffle plate 12 on each of two sides, and the gas inlet 2 and the gas outlet 3 are respectively located at the two sides of the activated carbon passage 11. And the position of the baffle plate 12 on the side of the gas outlet 3 is higher than the position of the baffle plate 12 on the side of the gas inlet 2. The gas flows in via the gas inlet 2, passes through the activated carbon passage 11, and is mixed with the ammonia gas, and then passes through the activated carbon passage 11 twice and then flows out via the gas outlet 3. Therefore, the adsorption time of the activated carbon is increased, so that the gas and the activated carbon are in full contact, thereby the utilization rate of the activated carbon is improved. In addition, the activated carbon absorption tower has a simple structure and a small gas flow resistance, which can significantly improve the efficiencies of desulfurization and denitration.

In this example, a plurality of the gas flow passages may also be provided, and each of the gas flow passages is provided corresponding to at least one of the activated carbon passages 11 and passing through the corresponding activated carbon passages 11 from opposite directions at least once. Increasing the gas flow passages can increase the gas capacity of the activated carbon absorption tower for one-time purification, and improve the efficiencies of desulfurization and denitration.

EXAMPLE 3

Figure 5:
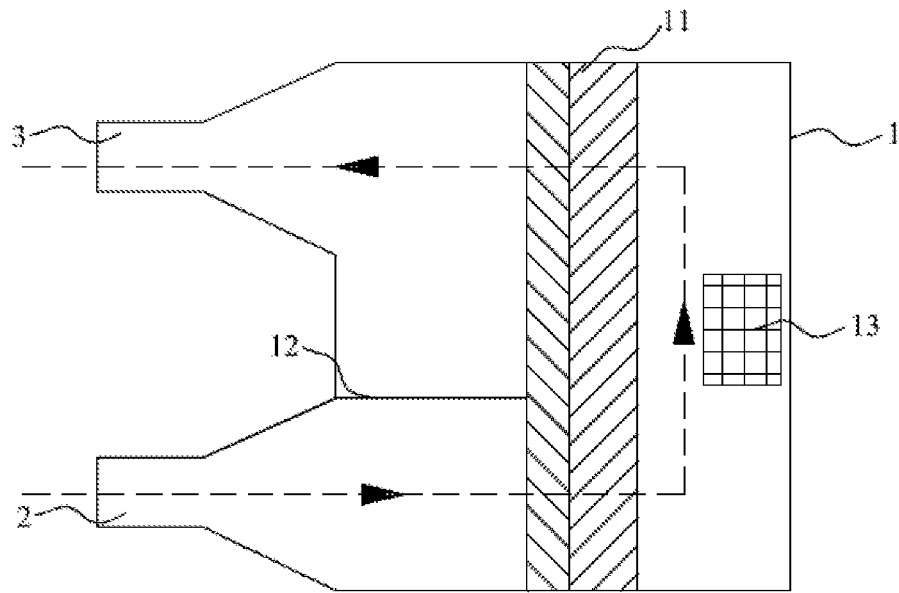
FIG. 5 is a schematic view showing the internal structure of an activated carbon absorption tower provided in Example 3 of the present invention.
Figure 6:
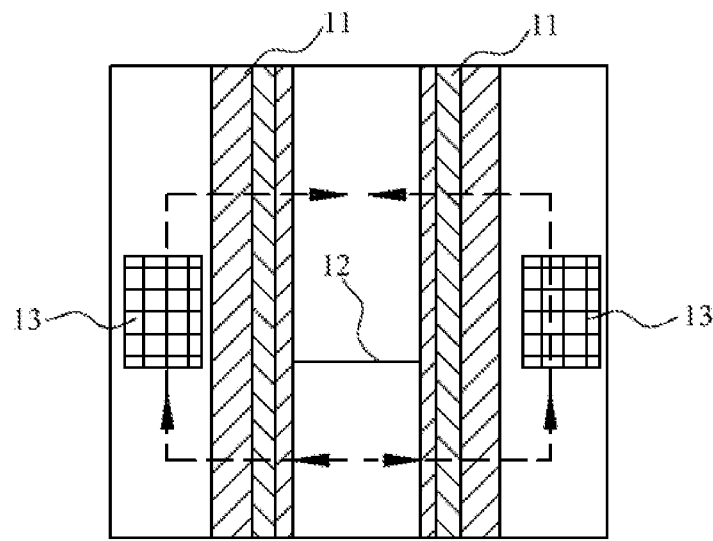
FIG. 6 is a schematic view showing the internal structure of another activated carbon absorption tower provided in Example 3 of the present invention.

Based on the above examples, as shown in FIG. 5 and FIG. 6, the activated carbon passage 11 is provided with a perforated partition plate or a reticulated partition plate along the activated carbon passage 11 for dividing the activated carbon passage 11 into a plurality of layers. The flow rate of each layer of activated carbon may be the same or different. The specific flow rate can be determined according to the adsorption rate of sulfides such as $SO_2$ and $NO_X$ by activated carbon, and the adsorption rates of different substances are inconsistent. When the adsorption rate is slower, the flow rate of activated carbon should be slower, so that the activated carbon has sufficient time for adsorption, avoiding waste of activated carbon resulted from the low adsorption concentration of activated carbon; when the adsorption rate of the substance is fast, a slower flow rate of activated carbon will cause the concentration of a certain substance in the activated carbon to be saturated, resulting in incomplete gas purification.

The two ends of each layer of the activated carbon passage 11 can share the same activated carbon feed bin 4. The activated carbon feed bin 4 is respectively in communication with the two ends of each layer of the activated carbon passage 11 through pipelines, and it is also possible to provide one activated carbon feed bin 4 for each layer of the activated carbon passage 11, as long as the sealing of the pipelines is satisfied and gas leakage is prevented. Each layer of the activated carbon passage 11 is provided with an on-off valve at two ends, and the on-off valves control each layer of activated carbon to flow out of or flow into the activated carbon feed bin 4 so as to avoid leakage of contaminated gas when the activated carbon is replaced or when the activated carbon flows in or out. Each layer of the activated carbon passage 11 is separately provided with a controller at the lower end, and the controller can control the flow rate of the activated carbon in the activated carbon passage 11. The flow rate of the activated carbon can be adjusted according to the concentration of the substances to be adsorbed in the actual gas and the adsorption rate.

When the activated carbon passage 11 is divided into two layers by a perforated partition plate or a reticulated partition plate, the thickness ratio of the two layers of activated carbon may be 1:10-1:1. When the activated carbon passage 11 is divided into three layers, the thickness ratio of each layer of activated carbon may be 1:10:15-1:1:1, and the specific ratio may be determined according to the concentration of a certain substance to be absorbed in the actually introduced gas.

EXAMPLE 4

This example provides a gas purification device comprising the activated carbon absorption tower in the above examples. The gas flow passage of this activated carbon absorption tower is U-shaped or serpentine-shaped. A fold flow mode is adopted for the flow of gas in the gas flow passage, that is, the gas passes through the same activated carbon passage 11 from opposite directions at least once, which increases the adsorption time of the activated carbon, so that the gas and the activated carbon are in full contact, thereby the utilization rate of the activated carbon is improved. In addition, the activated carbon absorption tower has a simple structure and a small gas flow resistance, which can significantly improve the efficiencies of desulfurization and denitration.

The aboves are merely preferred examples of the present invention. For those skilled in the art, according to the concept of the present invention, there would be changes in specific implementations and application scope. The contents of the present specification should not be understood as limiting to the present invention.

What is claimed is:

1. An activated carbon absorption tower for desulfurization and denitration, characterized in comprising:
   a source of gas including at least one sulfur oxide and at least one nitrogen oxide; an absorption tower body, a gas inlet fluidly connected to the source of gas including at least one sulfur oxide and at least one nitrogen oxide, and a gas outlet arranged on the absorption tower body, the absorption tower body being provided with an activated carbon passage having two ends and front and rear sides, a baffle plate and a gas flow passage connecting the gas inlet and the gas outlet; the gas flow passage being separated by the baffle plate into a U shape or serpentine shape, making the gas flow passage pass through the same activated carbon passage from opposite directions at least once, and the activated carbon passage being provided with flowing activated carbon inside and gas holes on a passage wall of the activated carbon passage for connecting the gas flow passages on both sides,
   wherein a ratio of distances from a contact point of the baffle plate and the activated carbon passage respectively to the two ends of the activated carbon passage is 1:1-1:4, and wherein a ratio of a distance between the front side of the activated carbon passage and an inner wall of the absorption tower body on the same side as the front side to a distance between the rear side of the activated carbon passage and an inner wall of the absorption tower body on the same side as the rear side is 4:1-1:1;
   wherein the activated carbon accounts for 25%-63% of the space inside the absorption tower body.

2. The activated carbon absorption tower according to claim 1 comprising a plurality of the gas flow passages, and each of the gas flow passages being provided corresponding to at least one of the activated carbon passages and passing through the corresponding activated carbon passages from opposite directions at least once.

3. The activated carbon absorption tower according to claim 1, comprising an ammonia injection grid arranged in a region within the gas flow passage where the gas inflows after passing through the activated carbon passage for the first time.

4. The activated carbon absorption tower according to claim 3 comprising the absorption tower body is divided into two parts by the activated carbon passage, the baffle plate being located between the activated carbon passage and the inner wall of the absorption tower body for dividing the gas flow passage to form the U-shaped passage, and the gas inlet and the gas outlet are located on the same side of the activated carbon passage and being respectively located on two sides of the baffle plate.

5. The activated carbon absorption tower according to claim 1 in which the activated carbon passage is provided with a perforated partition plate or a reticulated partition plate along the activated carbon passage for dividing the activated carbon passage into a plurality of layers.

6. The activated carbon absorption tower according to claim 5 in which each layer of the activated carbon passage is provided with an activated carbon feed bin and an on-off valve at both ends, and including a controller at the lower end of the activated carbon passage for controlling the flow rate of the activated carbon.

7. The activated carbon absorption tower according to claim 1 including a flow deflector arranged inside the gas inlet, and a gas flow distributor arranged inside the gas flow passage.

8. A gas purification device comprising the activated carbon absorption tower according to claim 1.

* * * * *